Oct. 20, 1931.  C. NIEDERMAYER  1,828,432

REGULATING SAFETY VALVE FOR HYDRAULIC SHOCK ABSORBERS

Filed June 12, 1928

Inventor
Carl Niedermayer
By Spencer, Hardman and Felix
His Attorneys

Patented Oct. 20, 1931

1,828,432

UNITED STATES PATENT OFFICE

CARL NIEDERMAYER, OF DAYTON, OHIO, ASSIGNOR, BY MESNE ASSIGNMENTS, TO DELCO PRODUCTS CORPORATION, OF DAYTON, OHIO, A CORPORATION OF DELAWARE

REGULATING SAFETY VALVE FOR HYDRAULIC SHOCK ABSORBERS

Application filed June 12, 1928. Serial No. 284,820.

This invention relates to improvements in shock absorbers for cushioning the movement of two relatively movable members such as the movement between the axle of a vehicle and the frame and body of a vehicle which is supported by springs upon said axle.

It is among the objects of the present invention to provide a shock absorber which will more effectively cushion not only heavy shocks caused by extended movements of the relatively movable members, but which will also permit the vehicle springs to function to cushion lighter shocks and dissipate the slighter vibrations occasioned by the passage of the vehicle over a slightly rough road or cobbled pavement.

More particularly, it is among the objects of the present invention, to provide means for imposing a relatively slight impedance to the initial movement of the relatively movable members, said impedance, however, being increased substantially, for more extended movements of the relatively movable members.

Further objects and advantages of the present invention will be apparent from the following description, reference being had to the accompanying drawings, wherein a preferred embodiment of one form of the present invention is clearly shown.

Figure 1:
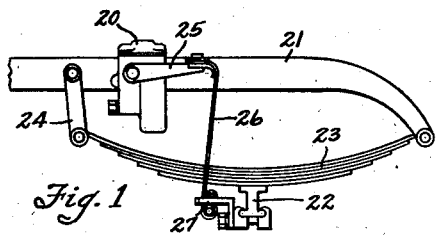
Fig. 1 is a side elevation of the device mounted on a vehicle.
Figure 2:
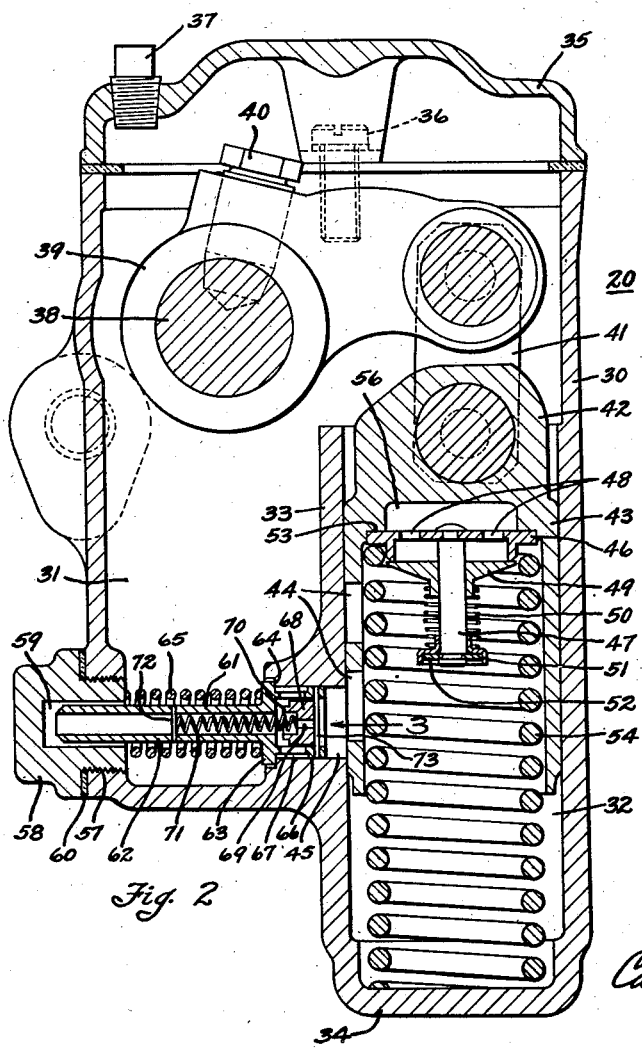
Fig. 2 is a vertical sectional view of the shock absorber.
Figure 3:
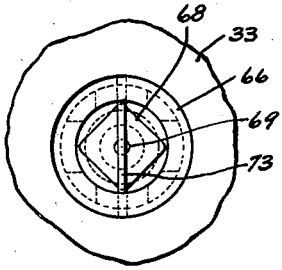
Fig. 3 is a detail view taken in the direction of the arrow 3 in Fig. 2.

Referring to the drawings, particularly to Fig. 1, the shock absorber designated as a whole by the numeral 20 is shown attached to the frame 21 of the vehicle. Frame 21 is supported on the axle 22 by a spring 23, one end of which is hingedly attached to the end of the frame, the other being hingedly attached to the frame by the shackle 24. The shock absorber operating arm 25 has one end of a strap 26 attached thereto, the other end of said strap being anchored to the axle 22 by a bracket 27.

The road wheels of the vehicle when striking obstructions in the roadway tend to flex the spring 23 toward the frame 21, thus permitting the shock absorber operating arm 25 to rotate in a counter-clockwise direction. The return of the spring 23 toward its normal position and the reactionary movement of the frame 21 away from the spring 23 will cause strap 26 to pull upon and move the shock absorber operating arm 25 in a clockwise direction.

The shock absorber 20 comprises a casing 30 presenting a fluid chamber 31 and a cylinder 32, the cylinder being formed by a portion of the outer walls of casing 30 and a partition 33 provided within said casing. The bottom end of the cylinder 32 is closed by the wall 34. A cover 35 is attached to the casing by means of screws 36, the cover being provided with a filler opening normally closed by a cap screw 37. The casing provides bearing portions for the rocker shaft 38, one end of which extends outside the casing and has the one end of the operating arm 25 attached thereto. Within the casing 30 the rocker arm 39 is secured to the shaft 38 by a set screw 40. The free end of rocker arm 39 has links 41 attached thereto, said links also being secured to a lug 42 formed on the head of the piston 43 which is adapted to be reciprocated in the cylinder 32. Openings 44 are provided in the skirt of the piston which are adapted to be moved into communicating alignment with a port 45 provided in the partition 33, said port forming a communication between the fluid chamber 31 and the interior of the cylinder 32 beneath the piston 43.

Within the piston 43 there is provided a valve seat member 46 having a central depending stud 47, the valve seat member having a series of openings 48 provided about the central stud 47. A valve 49 is slidably supported on the stud 47, said valve being held yieldably in engagement with the valve seat member by a spring 50 which is interposed between said valve 49 and a spring abutment cup 51 attached to the stud 47 by a member 52 which fits into a groove formed in stud 47 adjacent its end. The valve seat member 46 is maintained within an annular recess 53 formed in the interior surface of the piston head, by the spiral spring 54, one end of which engages the valve seat member 46, the other rests upon the end wall 34 of the cylinder. Spring 54 not only holds the valve seat member 46 in proper position in the piston, but also exerts a force tending to move the piston on its suction stroke or on its stroke toward the open end of the cylinder. This tendency of the piston to be moved on its suction stroke by spring 54 will also tend to rotate the rocker arm 39 and the shaft 38, upon which it is mounted, in a counter-clockwise direction and thus the operating arm 25 is likewise moved and consequently the flexible connection 26 between the operating arm 25 and the axle bracket 27 is held taut substantially at all times.

Passages 56 in the piston head provide communication between the fluid chamber 31 and the passages 48 of the valve seat member 46. The outer wall of the casing 30 has a screw threaded aperture 57 substantially in coaxial alignment with the port 45, said screw threaded aperture receiving the cap screw 58 having an inner recess 59 which is also substantially coaxial with the port 45. A gasket 60 is provided between the cap screw 58 and the wall of the casing to eliminate fluid leaks at that point.

The means for impeding the movement of the piston on its compression stroke comprises the relief valve 61 including a tubular stem portion 62, one end of which extends into the recess 59 of the cap screw 58. This tubular stem 62 has an annular flange 63 which is normally held in yieldable engagement with the valve seat 64 provided on the partition 33, by a spring 65 interposed between the annular flange 63 and the cap screw 58. A cylindrical extension 66 on the side of the annular flange 63 opposite the tubular stem 62 is slidably supported within the port 45, this cylindrical extension 66 has transverse passages 67 normally closed by the walls of the port 45. Within the cylindrical extension 66 there is provided a control valve 68 rectangular in shape and so dimensioned that the corners thereof slidably maintain the valve within the cylindrical extension. This control valve 68 has a central orifice 69 smaller in diameter than the inner diameter of the tubular stem 62. The inner surface of the valve 68 adjacent the tubular stem 62 is recessed, said recess being surrounded by an annular ridge 70 which is adapted to engage and seat upon the surface of the tubular stem 62. The ridge 70 is normally maintained out of engagement with the tubular stem 62 by a spring 71, one end of which is seated in the recess formed in the control valve 68, the other end engaging with a cross pin 72 provided in the tubular stem 62. Another cross pin 73 is provided in the cylindrical extension 66 to limit the movement of the control valve 68 under the effect of spring 71.

The operation of the device is as follows: When the road wheels of the vehicle strike slight obstructions in the roadway, such as a cobble pavement or the like, the spring 23 will be slightly flexed causing little movement of the arm 25 in a counter-clockwise direction and thus the slight return movement of the spring 23 toward its normal position will move the piston 43 a slight distance in the cylinder 32, consequently any fluid compressed within the cylinder 32 due to the slight movement of the piston, may freely escape through the space provided between the flat sides of valve 68 and the inner central wall of the cylindrical portion 66, through the tubular stem 62, through recess 59 of the cap screw 58 and thence into the fluid chamber 31, consequently effecting very slight impedance to this return movement of the spring 23 toward its normal position. When a substantial obstruction is met by the road wheels of the vehicle, however, spring 23 will be flexed considerably, thus permitting the spring 54 to move the piston 43 a substantial distance through its suction stroke, this movement of the piston causing the fluid within the fluid chamber 31 to force the valve 49 from its valve seat member 46 against the effect of spring 50, thus establishing a free flow of fluid from the fluid chamber 31 through passages 56 and 48 past the valve 49 into the cylinder 32. As soon as the spring 23 starts to return toward its normal position, the strap 26 pulling upon the operating arm 25 will cause the shaft 38 and the rocker arm 39 to be rotated clockwise and thus the piston 43 will be forced into the cylinder 32 on its compression stroke. The fluid within the cylinder 32 will consequently have a pressure exerted thereon which pressure, within predetermined values, will slidably move valve 68 against the effect of spring 71 into engagement with the end surface of the tubular stem 62 and thus shutting off the fluid passage through the space between the flat sides of valve 68 and the central wall of the cylindrical portion 66, the flow of fluid now being established through the aperture 69 of valve 68, which, being smaller than the passage in the tubular stem 62, will restrict the fluid flow from the cylinder 32 to the fluid chamber and consequently impede the compression movement of the piston, therefore exerting an impedance upon the separating movement of two relatively movable members which comprise the frame 21 and the axle 22 of the vehicle. This impedance substantially eliminates shocks due to rebound from being transmitted to the vehicle body. If the return movement of the spring 23 is comparatively sudden, or more specifically, if it attains a certain speed, excess pressure within the cylinder 32 will obtain, said pressure moving the valve stem flange 63 from its valve seat 64 against the effect of spring 65, thus uncovering the transverse openings 67 in the cylindrical extension 66 of the valve 61 and consequently establishing a second or divided fluid flow passage through the said transverse passages 67 which will relieve the excessive pressures within the cylinder 32. The amount of movement of the flange 63 from its valve seat 64 is dependent upon the degree of excessive pressures within the cylinder 32.

From the aforegoing it will be seen that the present invention presents a shock absorber which permits the vehicle springs to function as shock dissipating elements for the lighter road shocks transmitted to the vehicle, means being provided within the shock absorber for establishing an impedance to the movement of the relatively movable members when heavier shocks are experienced. The degree of impedance may be varied by the application of different types of valves 61, that is when greater impedance is desired a stiffer spring 65 may be provided, a lighter spring 71, and a valve 68 with a smaller orifice 69 may be inserted within the valve 61.

Another advantage of the present device is that the entire relief mechanism for the cylinder 32 is contained within a single assembly designated as the valve 61 in the present description.

While the form of embodiment of the present invention as herein disclosed, constitutes a preferred form, it is to be understood that other forms might be adopted, all coming within the scope of the claims which follow.

What is claimed is as follows:

1. A shock absorber having a casing providing a chamber containing a fluid which is subject to variations in pressure, a port leading from said chamber, a tubular valve presenting a longitudinal passage and communicating transverse passages, a spring normally urging the portion of said valve having the transverse passages, into the port to close the transverse passages, and a spring-loaded valve slidably supported in the said longitudinal passage, and having an orifice substantially coaxial of, and smaller in diameter than, the said longitudinal passage, said spring-loaded valve being adapted increasingly to restrict the flow of fluid through the tubular valve when the fluid pressure within the chamber exceeds a certain value.

2. A shock absorber having a chamber containing a fluid which is subject to variations in pressure, a port leading from said chamber; a tubular valve for said port, presenting a longitudinal passage, one portion of which is greater in transverse dimensions than the other and transverse passages communicating with the larger dimensioned passage portion, a spring normally urging said valve to close said transverse passages, and a rectangularly shaped valve slidably supported in the larger dimensioned passage portion, said rectangularly shaped valve having an orifice smaller in diameter than the smaller portion of the longitudinal passage, said valve being adapted to restrict the flow of fluid through said longitudinal passage when the fluid pressure within the chamber exceeds a predetermined value.

3. A shock absorber comprising in combination, a casing presenting a fluid chamber and a cylinder, a piston in the cylinder, means for establishing a free flow of fluid into said cylinder during the suction stroke of the piston, a port providing communication between the fluid chamber and the cylinder portion beneath the piston, a valve in said port, presenting dual fluid passages, resilient means normally urging said valve into said port to close one of said passages, and means for increasingly restricting the fluid flow through the other passage of the valve when the piston, on its compression stroke, provides a predetermined increased pressure upon the fluid within the cylinder.

4. A shock absorber comprising in combination, a casing presenting a fluid chamber and a cylinder, a piston in the cylinder, means for establishing a free flow of fluid into said cylinder during the suction stroke of the piston, a port providing communication between the fluid chamber and the cylinder portion beneath the piston, a relief valve slidably supported in said port and having two fluid passages, one of which is normally open, the other normally closed, a spring yieldably maintaining the relief valve in normal position, and a control valve adapted to restrict the flow of fluid through the normally open passage of the relief valve when the piston, on its compression stroke, provides a predetermined increased pressure upon the fluid within the cylinder.

5. A shock absorber comprising in combination, a casing presenting a fluid chamber and a cylinder, a piston in the cylinder, means for establishing a free flow of fluid into said cylinder during the suction stroke of the piston, a port providing communication between the fluid chamber and the cylinder portion beneath the piston, a relief valve for said port, having divided fluid flow passages, one of which provides constant communication between the cylinder and fluid chamber, the other being normally closed, a spring yieldably maintaining the relief valve in normal position, and a control valve normally ineffective but adapted to restrict the flow of fluid through the passage of the relief valve providing constant communication between the cylinder and fluid chamber, when the piston, during its compression stroke, provides a proper pressure upon the fluid within the cylinder.

6. A hydraulic shock absorber comprising, in combination, a casing providing a fluid reservoir and a cylinder; a piston in the cylinder forming a compression chamber therein; a port providing communication between the compression chamber and the fluid reservoir; a spring-loaded valve for controlling the flow of fluid through said port, said valve having a tubular valve-stem providing constant communication between the compression chamber and the fluid reservoir; an orificed valve slidably supported within said tubular valve stem and adapted to be moved out of normal position increasingly to restrict the flow of fluid through the said tubular valve stem; and a spring yieldably urging said orificed valve into its normal position.

7. A hydraulic shock absorber comprising, in combination, a casing providing a fluid rservoir and a cylinder; a piston in the cylinder forming a compression chamber therein; a port providing communication between the compression chamber and fluid reservoir; a spring-loaded valve for controlling the flow of fluid through said port, said valve having a tubular valve-stem providing constant communication between the compression chamber and the fluid reservoir, one end of said valve stem being slidably supported within the port and having transverse openings normally within the confines of said port, said end of the tubular valve-stem providing a valve-cage; an orificed valve within said valve-cage adapted to be moved out of normal position increasingly to restrict the flow of fluid through the tubular valve-stem, and a spring within said tubular valve-stem yieldably urging said orificed valve into its normal, fluid non-restricting position.

In testimony whereof I hereto affix my signature.

CARL NIEDERMAYER.